US009372298B2

(12) United States Patent
De Zwart et al.

(10) Patent No.: US 9,372,298 B2
(45) Date of Patent: Jun. 21, 2016

(54) LUMINAIRE

(75) Inventors: Siebe Tjerk De Zwart, Valkenswaard (NL); Jochen Renaat Van Gheluwe, Lommel (BE); Wilhelmus Petrus Adrianus Johannus Michiels, Reusel (NL); Menno Van Baardwijk, Eindhoven (NL); Fetze Pijlman, Eindhoven (NL); Cornelis Gerardus Maria De Haas, Nuenen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 74 days.

(21) Appl. No.: 14/122,279

(22) PCT Filed: May 28, 2012

(86) PCT No.: PCT/IB2012/052654
§ 371 (c)(1),
(2), (4) Date: Nov. 26, 2013

(87) PCT Pub. No.: WO2012/168822
PCT Pub. Date: Dec. 13, 2012

(65) Prior Publication Data
US 2014/0192550 A1  Jul. 10, 2014

(30) Foreign Application Priority Data
Jun. 9, 2011  (EP) .................................. 11169225

(51) Int. Cl.
F21V 7/04 (2006.01)
F21V 8/00 (2006.01)
F21S 8/06 (2006.01)

(52) U.S. Cl.
CPC .............. G02B 6/0005 (2013.01); F21S 8/063 (2013.01); G02B 6/0028 (2013.01);
(Continued)

(58) Field of Classification Search
USPC .................................................. 362/616, 628
See application file for complete search history.

(56) References Cited

U.S. PATENT DOCUMENTS 5,857,770 A  1/1999  Fohl et al.
5,913,594 A  6/1999  Iimura
(Continued)

FOREIGN PATENT DOCUMENTS

EP  2068181 A1  6/2009
JP  2004199967 A  7/2004
(Continued)

Primary Examiner — Y M Lee
(74) Attorney, Agent, or Firm — Meenakshy Chakravorty

(57) ABSTRACT

The invention relates to a luminaire that enables the use of more sparsely distributed light sources, having a uniform fixture surface brightness and good color mixing. The luminaire comprises first and second light guide layers (10, 11) optically coupled together by at least one optical coupler (12a, 12b), which allows the passage of light from the first (10) to the second light guide layer (11). The luminaire also comprises a plurality of light sources (16a, 16b), each of which being arranged such that light emitted by the light source (16a, 16b) is coupled into the first light guide layer (10) at an interface surface (17) arranged substantially perpendicularly to a longitudinal axis of the first light guide layer (10). The luminaire further comprises a scattering element (14) adapted to cause light to be emitted from an emitting surface of the second light guide layer (11). By providing two optically coupled light guide layers (10, 11), one for receiving light emitted by the light sources (16a, 16b) and the other for emission, greater opportunity for dispersion and color mixing of the light is provided.

16 Claims, 17 Drawing Sheets

(52) U.S. Cl.
CPC ............ *G02B 6/0053* (2013.01); *G02B 6/0076* (2013.01); *G02B 6/0021* (2013.01); *G02B 6/0051* (2013.01); *G02B 6/0055* (2013.01); *G02B 6/0068* (2013.01)

(56) References Cited

U.S. PATENT DOCUMENTS

| | | |
|---|---|---|
| 6,361,180 B1 | 3/2002 | Iimura |
| 6,951,401 B2 | 10/2005 | Van Hees et al. |
| 7,413,334 B2 | 8/2008 | Baba |
| 7,565,054 B2 | 7/2009 | Rinko |
| 7,661,865 B2 | 2/2010 | Baba |
| 2005/0007753 A1 | 1/2005 | Van Hees et al. |
| 2006/0114690 A1 | 6/2006 | Iki et al. |
| 2006/0262564 A1* | 11/2006 | Baba ............................ 362/616 |
| 2008/0239749 A1 | 10/2008 | Saccomanno et al. |
| 2009/0040786 A1 | 2/2009 | Mori |
| 2009/0257108 A1* | 10/2009 | Gruhlke et al. ............... 359/290 |
| 2010/0061080 A1* | 3/2010 | Salters et al. ................ 362/97.1 |
| 2010/0232138 A1 | 9/2010 | Tsai |
| 2010/0254121 A1 | 10/2010 | Zhou |
| 2011/0012942 A1 | 1/2011 | Kim et al. |

FOREIGN PATENT DOCUMENTS

| | | |
|---|---|---|
| JP | 2005332719 A | 12/2005 |
| WO | 2007138294 A1 | 12/2007 |

* cited by examiner

LUMINAIRE

FIELD OF THE INVENTION

The present invention relates to luminaires, such as luminaires suitable for mounting in or on a panel support element of a modular panel system. It also relates to a panel support element for a modular panel system comprising such luminaires.

BACKGROUND OF THE INVENTION

In construction, modular panel systems are commonly used to reduce build cost and construction time. Modular panel systems typically allow for the rapid construction of floors, walls and ceilings, albeit often at the compromise of reduced aesthetic appearance. A prime example of such a modular panel system is a suspended ceiling, which can be found in most professional environments, such as for example office spaces. A suspended ceiling typically comprises a metal or plastic grid defining rectangular or square recesses, which are filled with tiles to form a continuous ceiling.

In such modular systems, e.g. a suspended ceiling, lighting may be integrated into the system, typically by replacing one or more tiles with a lighting unit such as a luminaire. Most suspended ceilings comprise luminaires in which a number of fluorescent light tubes are present. For a number of reasons, such luminaires are not ideal. Firstly, such luminaires are considered aesthetically displeasing, i.e. obtrusive. Secondly, in order to improve light efficiency from such luminaires, they usually contain a reflector, which commonly has a parabolic shape. This however can cause glare for an occupant of the office space if the reflected light exits the luminaire under shallow angles to the plane of the modular system. Glare can be very disturbing in an office environment, as it can obscure the image on a computer monitor and can cause physical discomfort, e.g. headaches or sight problems, to the occupant when being subjected to the glare for a prolonged period of time. This is why health and safety standards such as the IEC60598-1:2008 standard in Europe require lighting solutions to comply with stringent requirements for preventing excessive glare levels.

Solutions exist to overcome glare. One solution involves luminaires comprising a plurality of chambers defined by respective parabolic reflectors, with a fluorescent light tube fitted in each of the chambers. Each of the light tubes is offset from the light exit plane of the luminaire such that light emitted by the fluorescent light tube under a shallow angle is reflected by the parabolic reflector, which increases the exit angle of the light, thus reducing glare. A drawback is that this solution leads to relatively bulky luminaires, which can be considered aesthetically unsatisfactory.

Another solution involves fitting luminaires for integration in a suspended ceiling with a micro-lens optical (MLO) plate or diffuser, which has the function of preventing shallow angle light beams from exiting the luminaire. As this causes a substantial amount of light being reflected back into the chamber of the luminaire, the luminaire may comprise a reflector to recycle such reflected light. Commonly, the micro-lens optical plate takes the form of a prism plate. Again, this style of luminaire is relatively bulky and obtrusive.

The company SwitchMade offer a light emitting diode based (LED) luminaire marketed under the name Paneos® for integration in a suspended ceiling. This has the advantage of lower energy consumption compared to fluorescent light tube-based luminaires.

However, as these luminaires replace tiles in the ceiling, they still disrupt the visual appearance of the suspended ceiling.

One important option for unobtrusively integrating lighting fixtures into the ceiling system is shown in FIG. 1. In this system thin lighting fixtures 1 are fixed onto support strips 2. The width of such a fixture 1 would typically be 25 mm with a thickness of a few millimeters. A set of such fixtures 1 would typically span the whole width or length of a room, yielding continuous "lightlines". A typical office ceiling would be equipped with multiple "lightlines" spaced approximately 60 cm apart. Ceiling tiles 3 can be suspended on the lighting fixtures 1 as shown.

The Gemino Company (www.gemino.it) markets a suspended ceiling solution in which the light fittings can be integrated into the band raster of the ceiling. The band raster consists of the main structural beams of the suspended ceiling. With smaller form factor lighting such as LED lighting this is a feasible solution, and has the advantage of the improved appearance of the ceiling due to the fact that no tiles need replacing with luminaires.

It is important with this kind of lighting fixture that the brightness is more or less uniform over the emission surface. If the surface contains high brightness non-uniformities, this can lead to glare and discomfort in the case of direct viewing. Since strip mounted lighting fixtures have a relatively small emitting area, the glare requirements are quite strict and an evenly distributed emission over the fixture surface is needed. Besides this, an even distribution is aesthetically more pleasing.

One successful design of strip mounted lighting fixture is shown in FIG. 2. It consists of a transparent light guide 4 (made from PMMA, for example), coated with a diffuser 5 and, optionally, with a reflector 6. The thickness of the light guide 4 is typically 1-2 mm. Light is generated by LEDs 7 at the sides and is coupled into the light guide 4. If the diffuser 5 were absent, the light would be guided by total internal reflection (TIR) towards the opposite side of the guide, and exit. The diffuser 5 serves to scatter the light out of the light guide 4. Once outside the light guide 4, the light encounters a micro lens optics (MLO) plate 8. This MLO plate 8 contains pyramid-like structures. It has the property that only light that exits the plate within a half-cone-angle of approximately 60° is transmitted. Light that is not transmitted is recycled; it returns towards the light guide 4 where it is redirected by the diffuser 5, and gets a second chance to escape.

If the LEDs are closely packed along the edges of the light guide 4, this design shows a pleasing, homogeneous light output over the surface of the MLO plate 8. In practice however, a high density closely packed LED distribution will generate too much light for the applications envisioned. With today's low power packages, the LEDs have to be spaced 1 to 2 cm apart. It is envisioned that lumen output of LEDs will increase significantly in the near future, and the spacing between LEDs will increase accordingly. Besides this, cost issues will probably stimulate the use of medium power or even high power LEDs. It has been found that when spacing the LEDs further apart, the homogeneity rapidly diminishes and becomes unacceptable.

This issue is exacerbated if the fixture is made color-tunable by using a mix of different color LEDs, like for instance warm white and cold white. In that case, the spacing per color increases even further. It has been found that using warm white and cold white LEDs at a LED-to-LED distance of 1 cm results in a surface light distribution that is very inhomogeneous. The positions of LED sources become clearly visible, having relatively high brightness, and mixing between the colors is very poor.

SUMMARY OF THE INVENTION

In accordance with one aspect of the invention, there is provided a luminaire comprising first and second light guide layers optically coupled together by at least one optical coupler, which allows the passage of light from the first to the second light guide layer, and a plurality of light sources, each of which is arranged such that light emitted by the light source is coupled into the first light guide layer at an interface surface arranged substantially perpendicularly to a longitudinal axis of the first light guide layer. The luminaire further comprises a scattering element adapted to cause light to be emitted from an emitting surface of the second light guide layer.

By providing two optically coupled light guide layers, one for receiving light emitted by the light sources and the other for emission, greater opportunity for dispersion and color mixing of the light is provided. Thus, the invention provides a luminaire suitable for strip mounting that enables the use of more sparsely distributed light sources, having a uniform fixture surface brightness and good color mixing.

Furthermore, by providing interface surfaces that are substantially parallel to the longitudinal axis, the light form the light source is coupled into the first light guide layer such that it may be coupled between the first and second light guide layers using total internal reflection alone without any light escaping.

The luminaire is typically one suitable for mounting in or on a panel support element of a modular panel system.

Preferably, the refractive index of the material from which the first and/or second light guide layers and/or the at least one optical coupler are made is greater than the square root of 2. After passage of the light from a light source across an interface surface into the first light guide layer, the maximum angle of the light rays within the first light guide layer with respect to the normal to the interface surface (i.e. the longitudinal axis of the first light guide layer) can be seen from Snell's law to be arcsin (1/n) degrees, where n is the refractive index of the first light guide layer. This assumes that the refractive index of air is 1 and that the light ray impinges on the interface surface at 90 degrees. Since the normals to the surfaces of all the other surfaces (except other interface surfaces) within the luminaire are perpendicular to the normal to the interface surface, the light will never hit any of those surfaces at an angle less than 90-arcsin (1/n) degrees. Provided that this angle exceeds 45 degrees, the light will undergo total internal reflection. Thus, the practical lower limit for refractive index, n, is the square root of 2, which ensures that 90-arcsin (1/n) always exceeds 45 degrees.

Normally, the light sources will be solid state light sources, such as light emitting diodes (LEDs).

The first and second light guide layers are typically planar. Preferably, they are parallel or substantially parallel.

The first and second light guide layer may each have an inwardly facing surface (i.e. the facing surface of each of the first and second light guide layer may lie opposite the facing surface of the other of the first and second light guide layer). In this case, the emitting surface will usually be the opposite surface of the second light guide layer to the inwardly facing surface.

The first and second light guide layers may be spaced apart by an opaque layer, which could be the scattering element.

In a preferred embodiment, the at least one optical coupler comprises an edge coupler for coupling adjacent edges of the first and second light guide layers.

Preferably, the at least one edge coupler is simply an extension of the first and second light guide layers. In essence, it provides a bend for joining the two layers together. Normally, the at least one edge coupler extends along the whole of the adjacent edges of the first and second light guide layers.

The at least one optical coupler may comprise two spaced apart mirrored surfaces.

In some embodiments, the at least one optical coupler comprises at least one coupling element passing between inwardly facing surfaces of the first and second light guide layers.

The luminaire typically further comprises an optical structure associated with the second light guide layer adapted to couple light into a desired angular range. This may be an external MLO.

Alternatively, the optical structure may be formed in the emitting surface, or an inwardly facing surface, opposite to the emitting surface, in the second light guide layer.

Preferably, the first and second light guide layers and the optical coupler are integrally formed. In this case, the whole assembly of the first and second light guide layers and the optical coupler may be formed by extrusion, for example. This is a very cost effective way of manufacture.

The luminaire may further comprise a gap in the first light guide layer, the gap extending between two edges of the first light guide layer opposed along a longitudinal axis of the first light guide layer. This structure can be made by folding a sheet of the light guide material, the outer edges of the sheet being brought together adjacent the gap. Again, this results in an integral structure of the first and second light guides and the optical coupler, and is cheap to manufacture.

Typically, the luminaire further comprises a plurality of cavities in the first light guide layer, at least one of the plurality of light sources being disposed within each cavity. There may be two light sources disposed in each cavity, in which case they will normally face in opposing directions.

Each cavity preferably has a side wall forming the interface surface and extending substantially perpendicularly to the longitudinal axis of the first light guide layer, a light source within each cavity being disposed to emit light towards the side wall.

If there are two light sources in a cavity then preferably each cavity has two opposed side walls extending substantially perpendicular to a longitudinal axis of the first light guide layer, each light source within each cavity being disposed to emit light towards a respective one of the side walls.

Each cavity may comprise two converging side walls, a light source within each cavity facing away from the two converging side walls. The two converging side walls typically meet at an apex, which will normally be located opposite to the side wall perpendicular to the longitudinal axis of the first light guide layer.

The plurality of light sources may comprise first and second sets of light sources, each set adapted to emit light of different colors.

The luminaire may further comprise an array of optical structures in the first light guide layer, each of the optical structures disposed on a straight line path between two of the plurality of light sources and adapted to reflect light emitted by one or other of the light sources along the path. The optical structures are typically cavities formed, for example in rectangular or rhomboid shapes, which cause reflection of light emitted by one light source before it impinges on a cavity containing another light source.

The scattering element is typically disposed between the first and second light guide layers.

In accordance with a second aspect of the invention, there is provided a panel support element for a modular panel system comprising a luminaire according to the first aspect of the invention.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
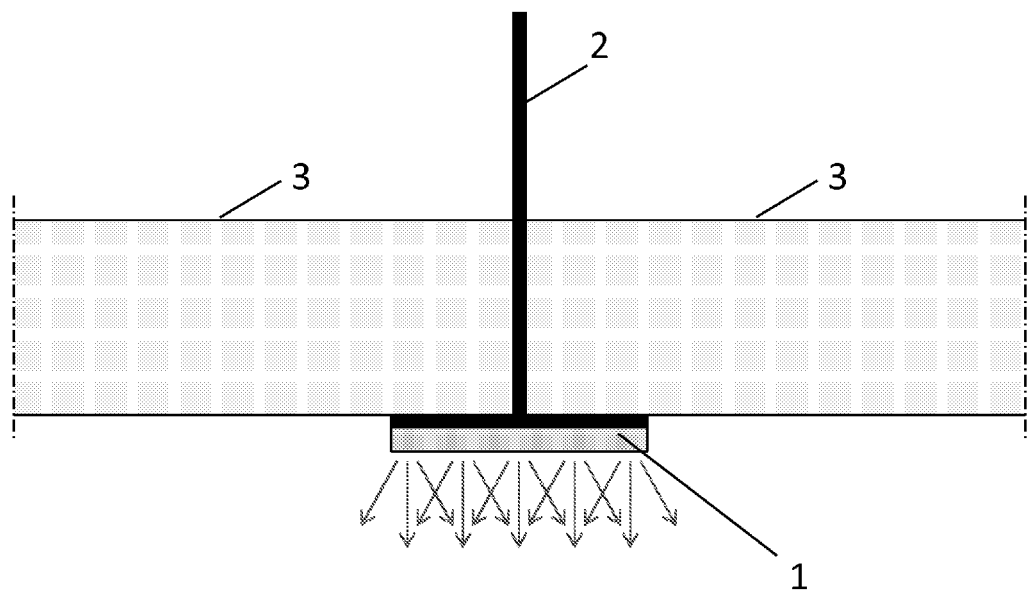
FIG. 1 shows a prior art strip mounted luminaire.
Figure 2:
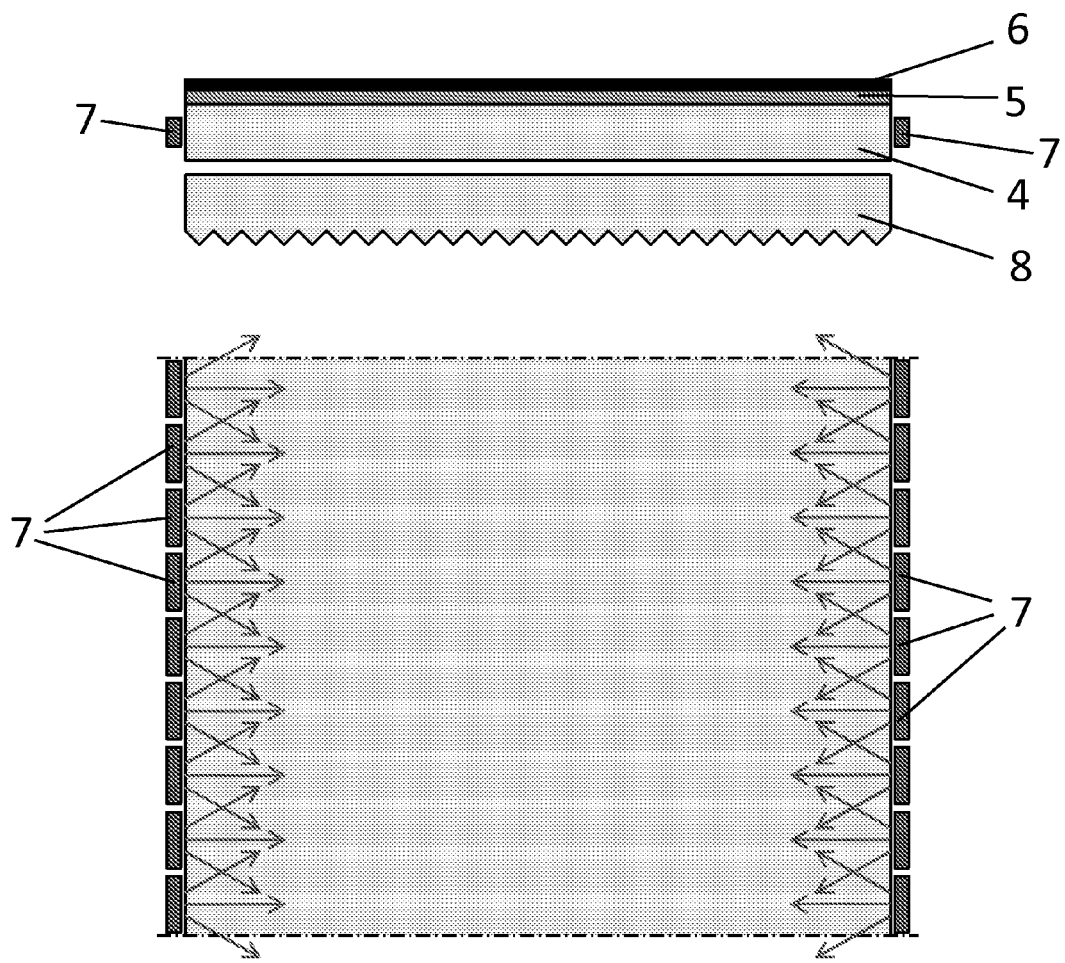
FIG. 2 shows the luminaire of FIG. 1 in more detail.

It should be understood that the figures are merely schematic and are not drawn to scale. It should also be understood that the same reference numerals are used throughout the figures to indicate the same or similar parts.

Figure 3A:
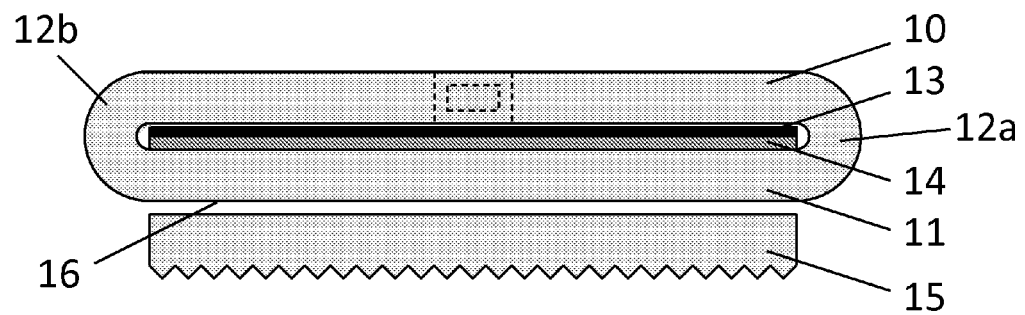
FIGS. 3a and 3b show side and top views respectively of a first embodiment of a luminaire according to the invention.
Figure 3B:
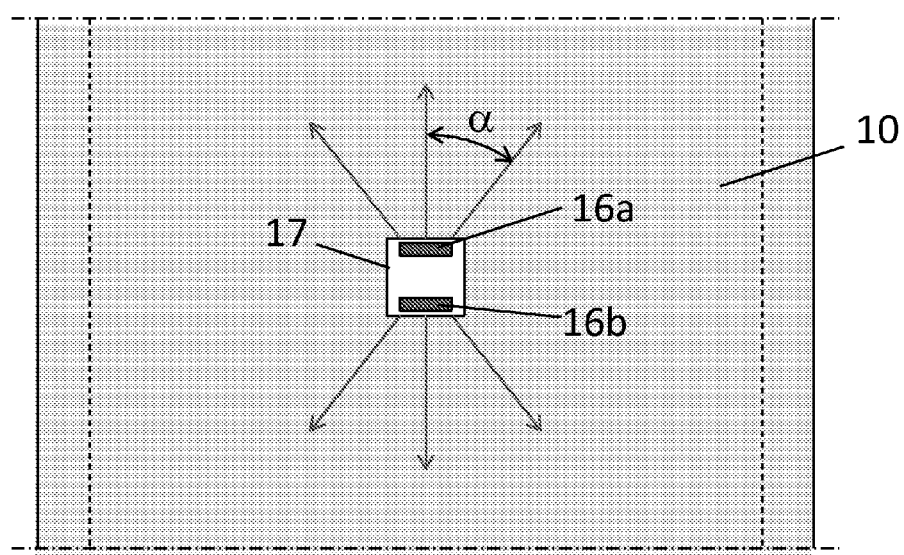

A first embodiment of the invention is shown in FIGS. 3a and 3b. In this a first or top light guide layer 10 is optically coupled to a second or bottom light guide layer 11 via optical couplers 12a and 12b. The optical couplers 12a and 12b are simply bends to allow the passage of light from the top light guide layer 10 to the bottom light guide layer 11, which lie parallel and spaced apart from each other. The top light guide layer 10, the bottom light guide layer 11 and optical couplers 12a and 12b are contiguous and form an integral structure, which may be manufactured for example by extrusion. They may be made from suitable materials such as PMMA or polycarbonate.

In the space between the top and bottom light guide layers 10, 11 there are an opaque reflector layer 13 and a diffusing layer 14. The opaque reflector layer 13 ensures that the LEDs mounted in the first light guide layer 10 cannot be seen through the bottom light guide layer 11. If the diffusing layer 14 is sufficiently thick, the opaque reflector layer 13 may be omitted. If the diffusing layer 14 is not sufficiently thick to obscure sight of the LEDs through the second light guide layer 11, but is sufficiently thick to reflect substantially all the light entering from the second light guide layer 11 then the opaque reflector layer 13 may be replaced by a simple non-reflecting opaque layer, which may be light-absorbing, for instance black. An MLO plate 15 is provided adjacent an emission surface 16 of the second light guide layer 11. This MLO plate 15 only transmits light within a certain angular range and helps to prevent glare.

Two LEDs 16a, 16b are shown placed in a cavity 17 in the first light guide layer 10. There are several such cavities, each having two LEDs within them. The LEDs 16a, 16b are placed such that they emit in a direction parallel to a longitudinal axis of the first light guide layer 10. The LEDs 16a, 16b face away from each other and emit light in opposing directions. By arranging the LEDs 16a, 16b in this way, the light on average travels in the longitudinal direction of the first light guide layer 10, resulting in the light spreading out considerably before entering the second light guide layer 11. This facilitates homogenization and color mixing.

The LEDs 16a, 16b as shown in FIG. 3b emit light so that it is incident on a side wall of the cavity 17. The side wall of the cavity 17 is perpendicular to the longitudinal axis of the first light guide layer 10. The light emitted by the LEDs 16a, 16b is refracted at the interface between the boundary and the side wall towards the longitudinal axis. Thus, the light emitted by the LEDs 16a, 16b does not need to be emitted at right angles to the side wall to be properly transported through the system.

The LEDs 16a and 16b may be placed on a PCB, which is preferably located in the space between the top and bottom light guide layers 10, 11. This has the advantage that the PCB is electrically insulated from the outside world as the light guide layers are not electrically conductive. If the LEDs 16a and 16b are placed on a PCB that is located in the space between the top and bottom light guide layers 10, 11, the opaque reflector layer 13 (or the non-reflecting opaque layer) and/or the diffusing layer 14 may be part of the PCB. The PCB may further be in optical contact with the bottom light guide layer 11, thereby providing a means to extract light from this layer.

The light in the first light guide layer 10 is propagated within an angle relative to the longitudinal axis of α, which equals arcsin (1/n), n being the refractive index of the material from which first light guide layer 10 is made. For practical materials with n=1.5 or higher, the angle a typically equals 42° or less. This ensures that as long as the emitted light rays do not encounter disturbing elements like cavities, LEDs or scattering elements or layers, they will always remain in the first or second light guide layers 10, 11 or the optical couplers 12a, 12b by virtue of total internal reflection. This is true even if the optical couplers 12a, 12b are bent very sharply, and even if the path of the optical couplers 12, 12b is not along an arc, but angular.

Figure 4:
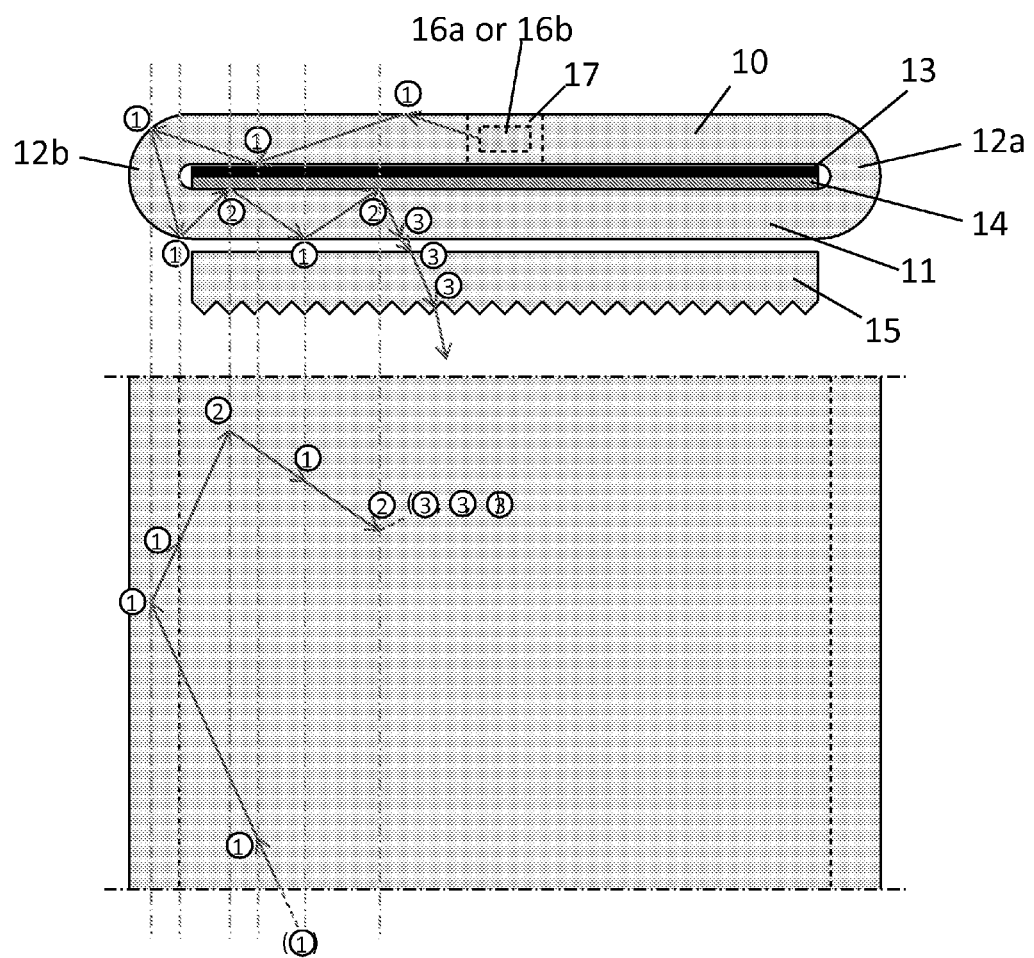
FIG. 4 shows an example of a light ray traversing through the light guide layers in the embodiment of FIG. 3.

An example of a light ray traversing the system is shown in FIG. 4. The light from the LED 16a or 16b traverses the first light guide layer 10 in the forward direction and to the sides, and then bends around the optical coupler 12b and enters the second light guide layer 11. The numeral "1" in a circle indicates where the light ray undergoes total internal reflection; the numeral "2" in a circle indicates where it is scattered; and the numeral "3" in a circle indicates where it is refracted. As can be seen, after being totally internally reflected several times, the light ray is eventually scattered by the diffusing layer 14 at a sufficiently steep angle for it to be transmitted by MLO plate 15.

Figure 5:
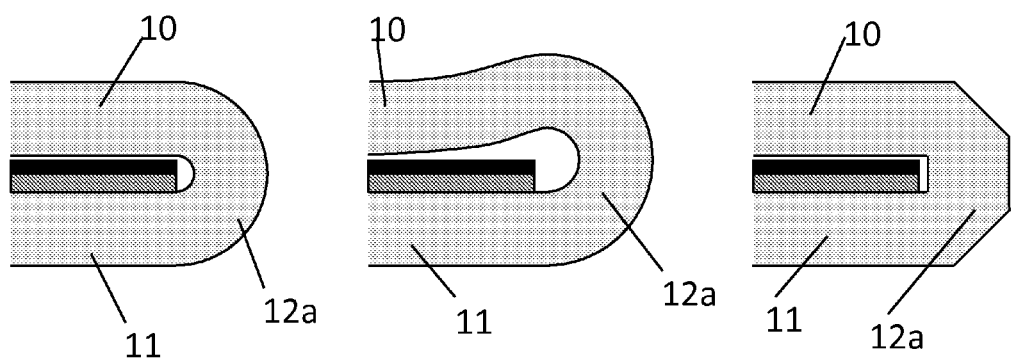
FIG. 5 shows examples of how the optical coupler may be formed in the embodiment of FIG. 3.

FIG. 5 shows three different types of optical coupler that may be used. As stated above, if the light rays are undisturbed whilst travelling through the first light guide layer 10 they will not be emitted from the optical couplers 12a, 12b, irrespective of the shape of these. However, an important aspect is that preferably all the light generated in the first light guide layer 10 can travel through the optical couplers 12a, 12b towards the second light guide layer 11. For some geometries this may not be the case, and part the light remains in the first light guide layer 10 and, in practice, ultimately gets lost. The most preferable shape is that shown at the far left where the optical couplers 12a, 12b are semi-circular with the centers of the semi-circular inner and the outer walls coinciding. In this case, all light is transmitted from the first 10 to the second light guide layer 11. Deviations are allowed, but may give rise to some losses. The other two shapes shown (i.e. approximately semi-circular as in the middle illustration and facetted as in the right hand illustration) provide acceptable results.

Figure 6A:
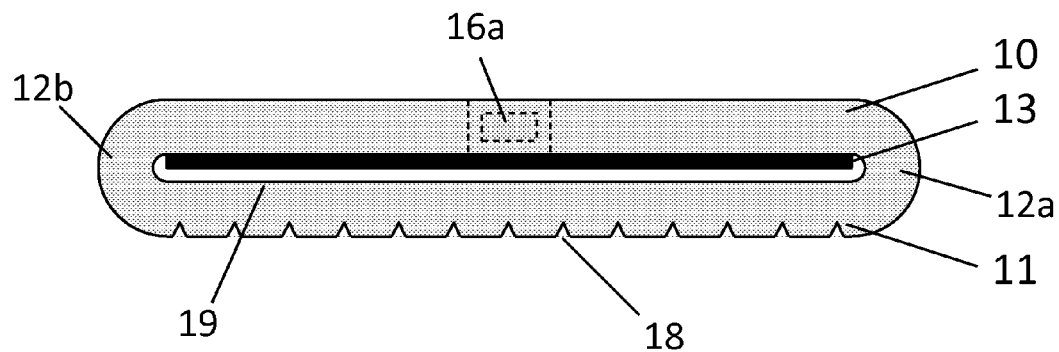
FIGS. 6a and 6b show examples of integral scattering elements that may be used with the invention.
Figure 6B:
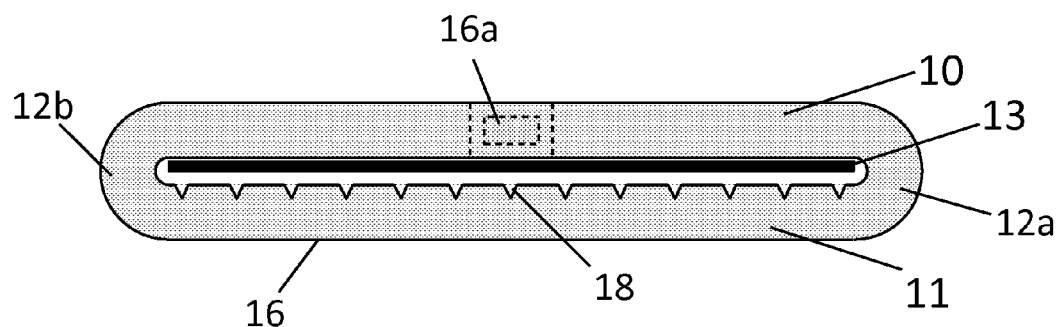

FIGS. 6a and 6b show examples of how the MLO plate 15 may be dispensed with. In these, micro-optic structures 18 are formed on or in either the emitting surface 16 (FIG. 6a) or the inwardly facing surface 19 of the second light guide layer 11. The micro-optic structures 18 couple the light into the desired angular range without the need for the MLO plate 15. A reflecting layer between the opaque layer and the second light guide layer 11 is optional.

Figure 7:
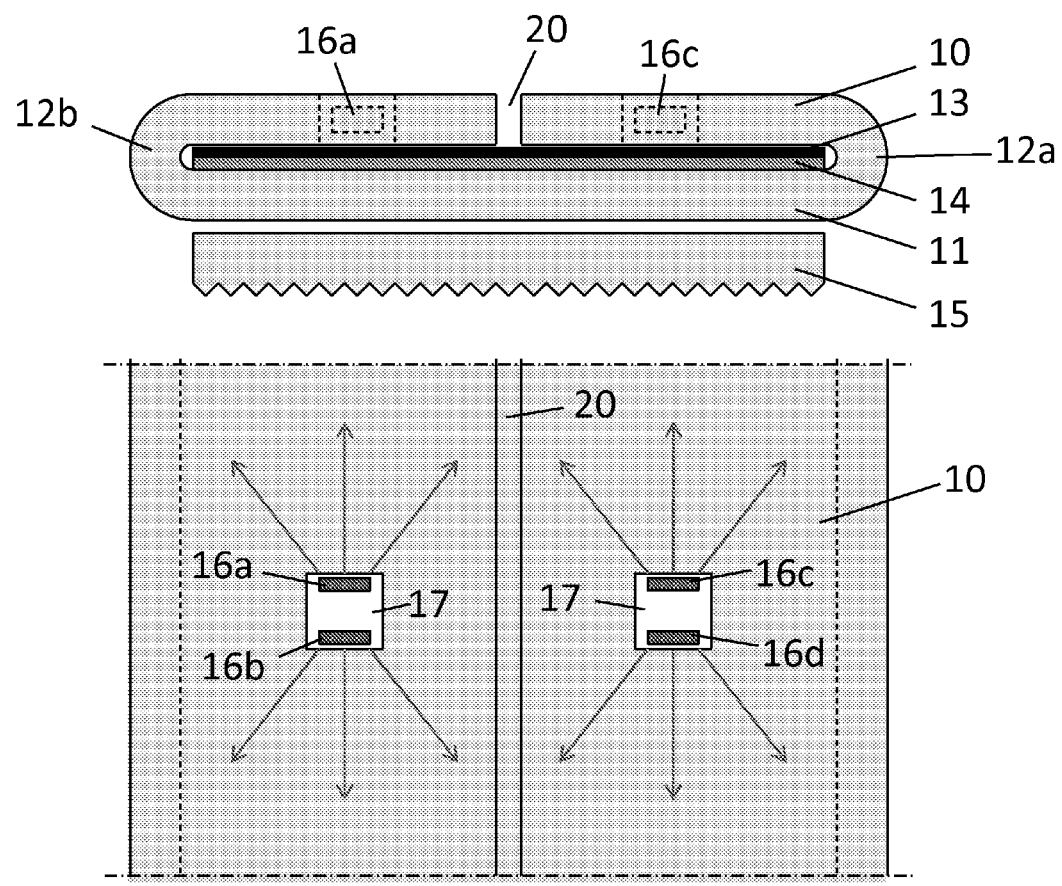
FIG. 7 shows a second embodiment of a luminaire according to the invention.
Figure 8:
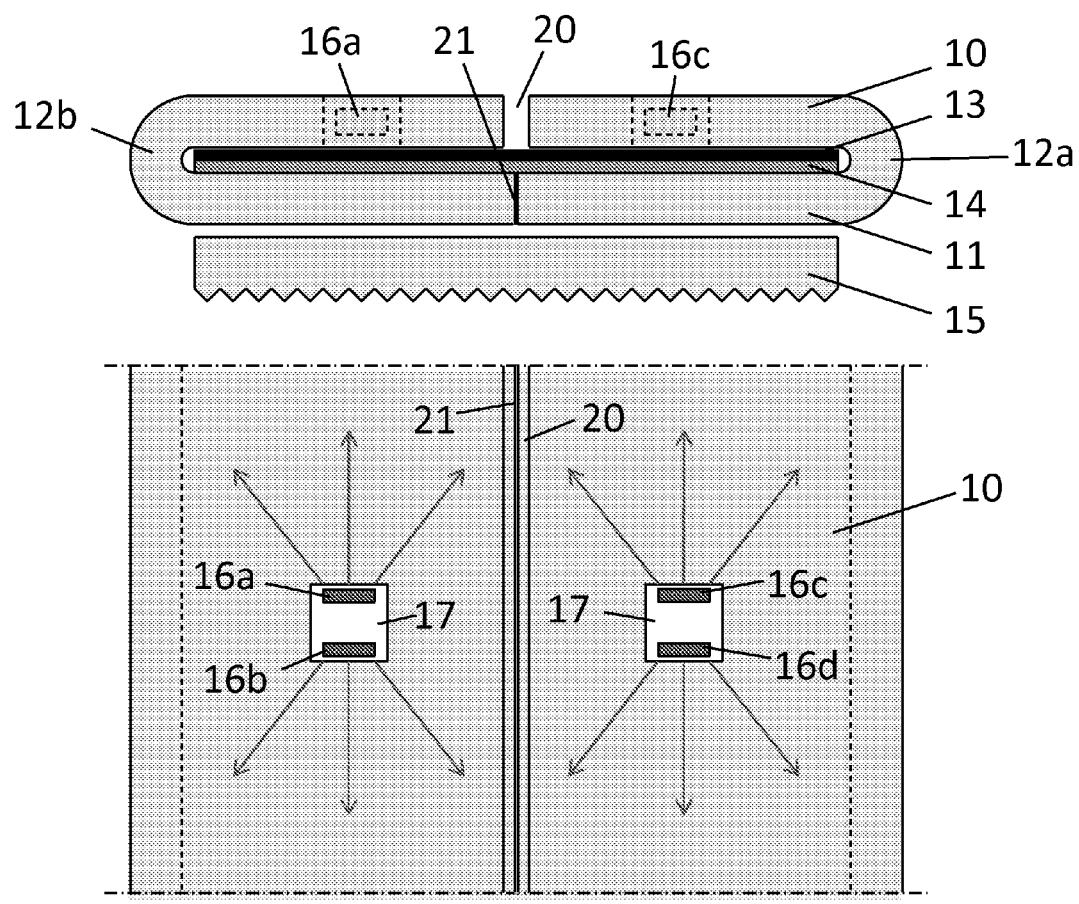
FIG. 8 shows a third embodiment of a luminaire according to the invention.

As mentioned above, the light guide structures discussed so far and shown in FIGS. 3 to 6b may be made in one piece, for instance by extrusion. However, alternative embodiments are possible, allowing different fabrication technologies. FIG. 7 shows such an alternative embodiment, which can be made by bending a flat strip of the light guide material. This results in a gap 20 in the first light guide layer 10. Now the LEDs 16a-16d can be placed in off-centre cavities 17a, 17b. If the gap 20 is made very narrow or even completely closed, the LEDs could be placed in a central cavity as with the first embodiment. The gap 20 may be not straight, but may be curved and the size of the gap 20 may vary along the longitudinal direction of the device. The shape of the gap may be chosen to perform optical effects in the first light guide layer 10.

FIG. 9 shows yet another embodiment, consisting of two separate parts with a gap 20 in the first light guide layer 10 and another gap 21 in the second light guide layer 11. The gap 21 in the second light guide layer is preferably very thin, or it will become visible. FIGS. 9a to 9h show different layouts for the light sources in the first light guide layer 10. In FIG. 9a, the cavities 17a to 17c are centered along the longitudinal axis of the first light guide layer 10. In FIG. 9b, the cavities 17a to 17d are distributed on either side of the longitudinal axis. FIGS. 9c and 9d show cavities 17a to 17c suitable for use with one single LED 16a to 16c per cavity 17a to 17c. In this case the shape of the cavities is triangular, and is chosen such that light from a certain LED 16a to 16c will not directly encounter the next LED in sight (and then be lost). By tapering the cavities as shown, the light will be deflected towards the bends as is shown by the dashed arrows in FIG. 9c.

Figure 9A:
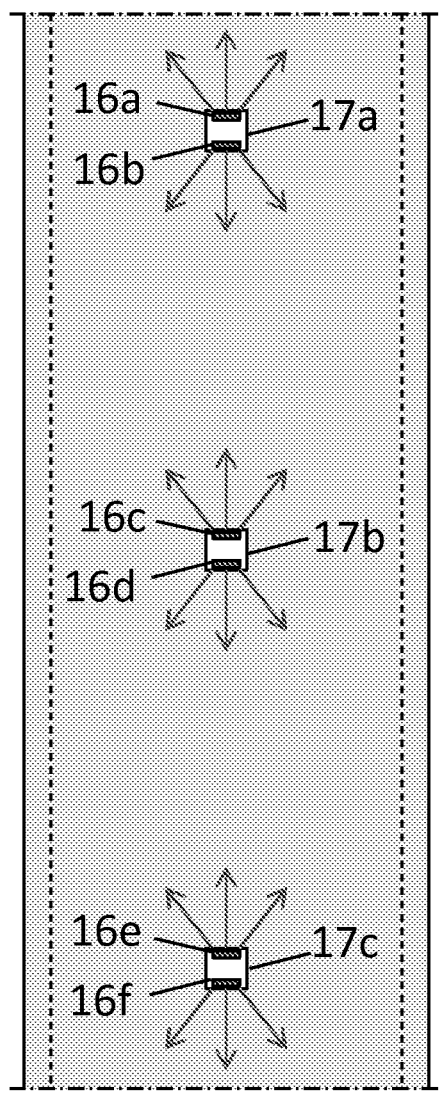
FIGS. 9a-h show examples of how the light sources may be distributed and of additional optical structures that may be provide in the first light guide layer in each of the first to third embodiments.
Figure 9B:
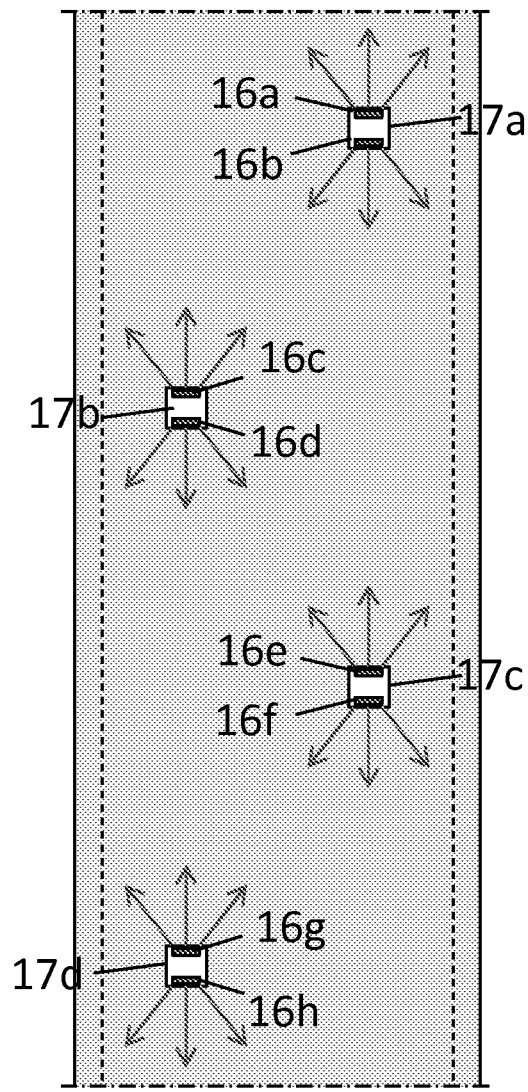
Figure 9C:
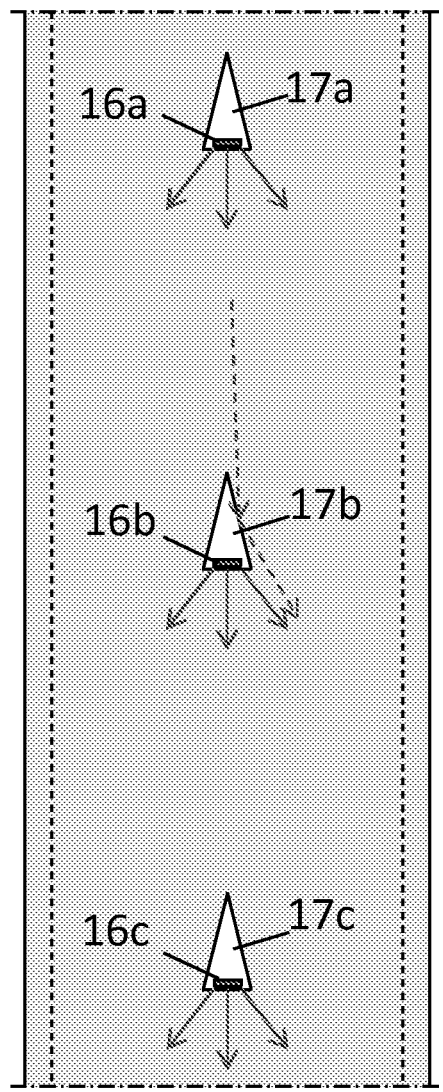
Figure 9D:
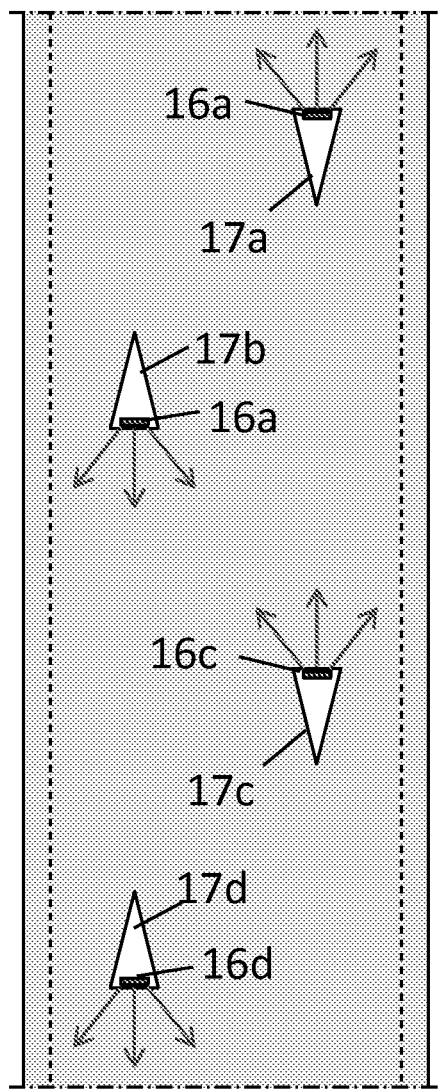
Figure 9E:
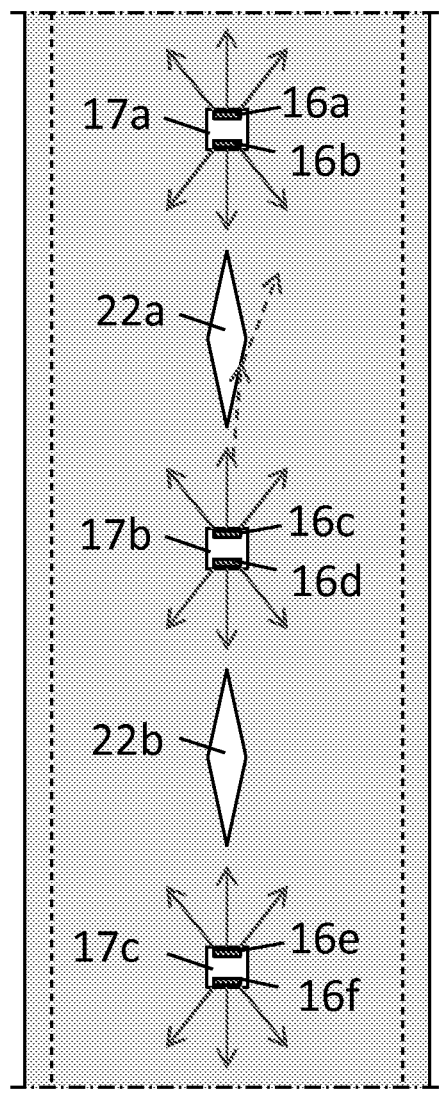
Figure 9F:
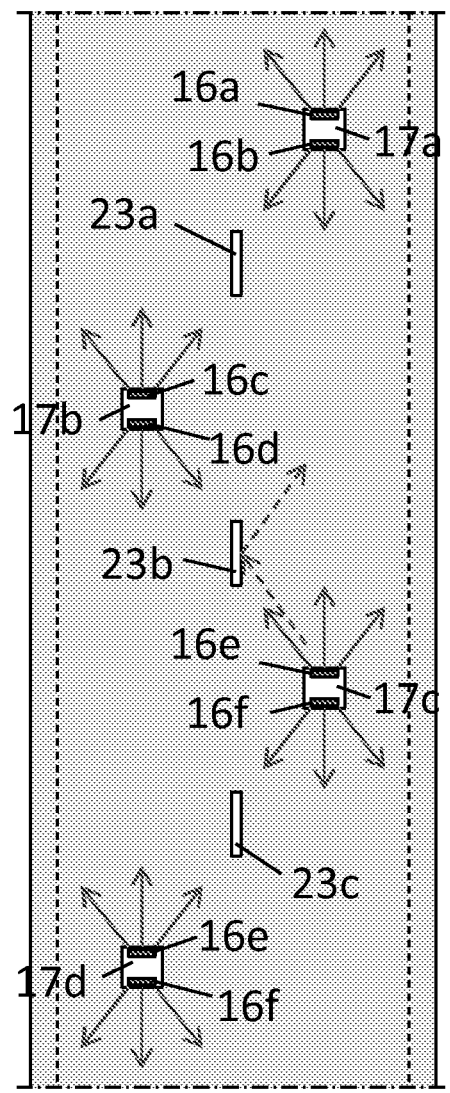

FIGS. 9d and 9e show additional optical elements integrated in the first light guide layer 10. In FIG. 9d, the optical elements consist of rhombus-shaped cavities 22a, 22b which prevent light emitted from any of LEDs 16a-16f from impinging on any of the other LEDs 16a-16f and being scattered prematurely. In FIG. 9e thin rectangular slits 23a-23c are used for the same purpose. The rectangular slits are well-suited to the distributed layout shown in FIG. 9e.

Rhombuses, rectangular slits, and in fact cavities with any other shape can be used not only for shielding neighboring LEDs from each other but also to shape the beams travelling through the first light guide layer 10. Care must be taken however, since any cavity (except thin narrow slits extending in the longitudinal direction) will alter the angular distribution of the rays inside the first light guide layer 10. If this occurs, a portion of the light may escape prematurely from the cavities themselves or in the optical couplers 12a, 12b.

Figure 9G:
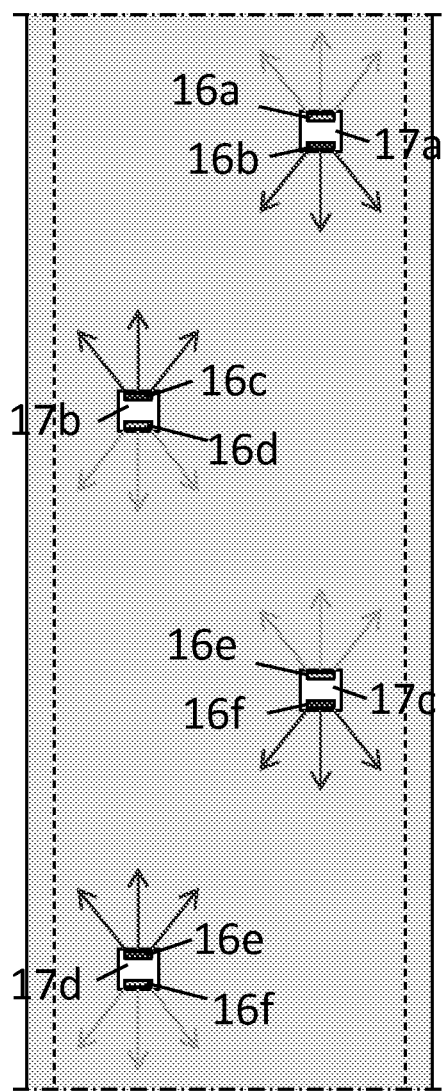
Figure 9H:
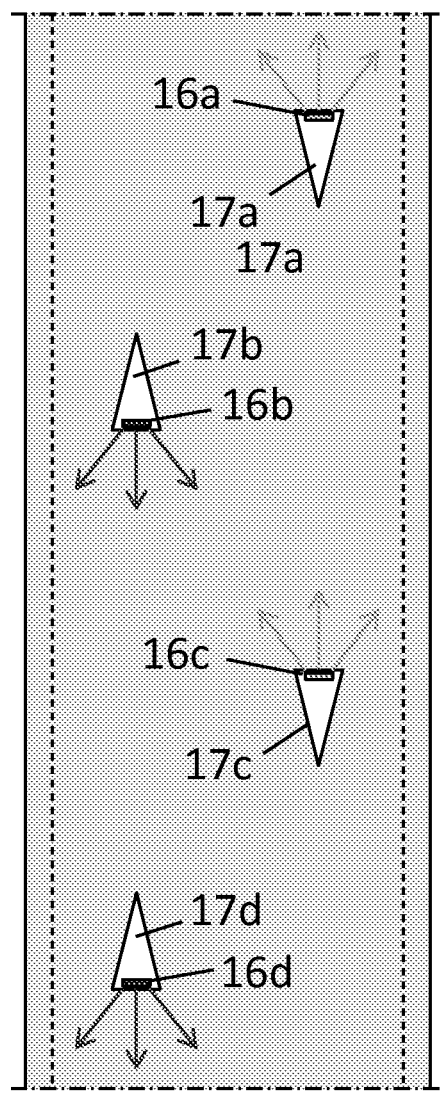

FIGS. 9g and 9h show examples of embodiments for combining different color-temperature LEDs in the top guide. In FIG. 9g, the LEDs 16a, 16c, 16e, 16g facing in a first direction are of one color, for example warm white, and the LEDs 16b, 16d, 16f, 16h facing in a second direction are of another color, for example cold white. In FIG. 9h, the triangular cavities 17a, 17c face in the opposite direction to cavities 17b, 17d. The LEDs 16a, 16c in cavities 17a, 17c are of one color, for example cold white, whereas the LEDs 16b, 16d in cavities 17b, 17d are of another color, for example warm white.

Figure 10A:
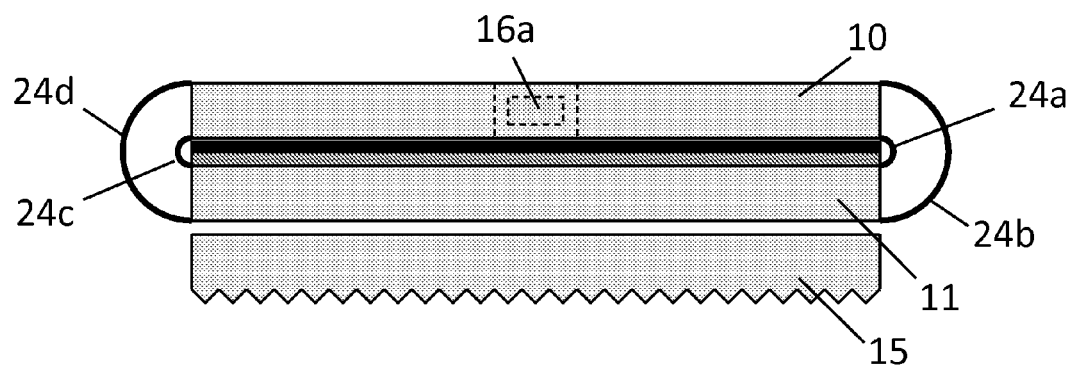
FIGS. 10a and 10b show additional ways of optical coupling between the first and second light guide layers.
Figure 10B:
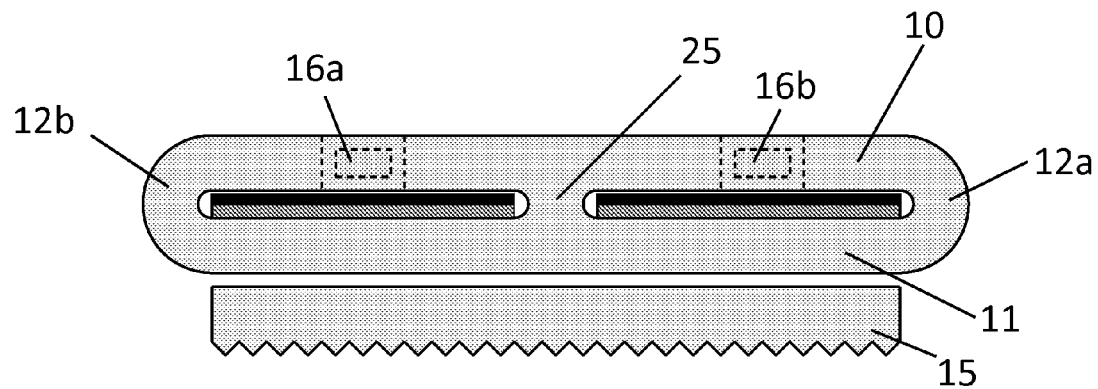

FIGS. 10a and 10b show alternatives for optical coupling between the first and second light guide layers 10, 11. In FIG. 10a, the integral optical couplers 12a, 12b are replaced with curved mirrors 24a-24d. Also segmented mirrors could be used. This embodiment is less preferred because of possible losses at the mirrors 12a to 12d. However, it might be cheaper and easier to manufacture since only flat light guide layers need to be made and handled.

FIG. 10b contains an extra optical coupling element 25 is provided to transport the light from the first light guide layer 10 to the second light guide layer 11. Multiple optical coupling elements may be provided transversely across the first and second light guide layers 10, 11. The side walls of the optical coupling element 25 have a curved shape, but they may be straight or segmented. Preferably, the optical coupling element extends longitudinally along the whole length of the first and second light guide layers 10, 11. This variation could be made by, for instance, extrusion.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed:

1. A luminaire comprising:
   first and second light guide layers optically coupled together by at least one optical coupler, which allows the passage of light from the first to the second light guide layer, the at least one optical coupler comprising an edge coupler for coupling adjacent edges of the first and second light guide layers, the adjacent edges being parallel to a longitudinal axis of the first light guide layer;
   a plurality of light sources, each light source being arranged such that light emitted by the light source is coupled into the first light guide layer at an interface surface arranged substantially perpendicularly to the longitudinal axis of the first light guide layer so that the light travels substantially in a direction parallel to the longitudinal axis of the first light guide layer; and
   a scattering element adapted to cause light to be emitted from an emitting surface of the second light guide layer.

2. A luminaire according to claim 1, wherein at least one of the first light guide layer, the second light guide layer and the at least one optical coupler is made from a material having a refractive index that is greater than the square root of 2.

3. A luminaire according to claim 1, wherein the at least one optical coupler comprises two spaced apart mirrored surfaces.

4. A luminaire according to claim 3, wherein the at least one optical coupler comprises at least one coupling element passing between inwardly facing surfaces of the first and second light guide layers.

5. A luminaire according to claim 4, further comprising an optical structure associated with the second light guide layer adapted to couple light into a desired angular range.

6. A luminaire according to claim 5, wherein the optical structure is formed in the emitting surface, or an inwardly facing surface, opposite to the emitting surface, in the second light guide layer.

7. A luminaire according to claim 6, wherein the first and second light guide layers and the optical coupler are integrally formed.

8. A luminaire according to claim 7, wherein a gap is defined in the first light guide layer, the gap extending between two edges of the first light guide layer opposed along the longitudinal axis of the first light guide layer.

9. A luminaire according to claim 8 wherein a plurality of cavities are defined in the first light guide layer, each cavity having a side wall forming the interface surface and extending substantially perpendicularly to the longitudinal axis of the first light guide layer, at least one of the plurality of light sources being disposed within each cavity to emit light towards the side wall.

10. A luminaire according to claim 9, wherein each cavity comprises two converging side walls, a light source within each cavity facing away from the two converging side walls.

11. A luminaire according to claim 10, wherein the plurality of light sources comprises first and second sets of light sources, each set adapted to emit light of different colors.

12. A luminaire according to claim 11, further comprising an array of optical structures in the first light guide layer, each of the optical structures disposed on a straight line path between two of the plurality of light sources and adapted to reflect light emitted by one or other of the light sources along the path.

13. A luminaire according to claim 12, wherein the scattering element is disposed between the first and second light guide layers.

14. A panel support element for a modular panel system comprising a luminaire according to claim 13.

15. A luminaire comprising:
first and second light guide layers optically coupled together by at least one optical coupler, which allows the passage of light from the first to the second light guide layer, the at least one optical coupler comprising an edge coupler for coupling adjacent edges of the first and second light guide layers, the adjacent edges being parallel to a longitudinal axis of the first light guide layer,
a plurality of light sources, each light source being arranged such that light emitted by the light source is coupled into the first light guide layer at an interface surface arranged substantially perpendicularly to the longitudinal axis of the first light guide layer so that the light travels substantially in a direction parallel to the longitudinal axis of the first light guide layer; and
a scattering element adapted to cause light to be emitted from an emitting surface of the second light guide layer,
wherein a gap is defined in the first light guide layer, the gap extending between two edges of the first light guide layer opposed along the longitudinal axis of the first light guide layer.

16. A luminaire comprising:
first and second light guide layers optically coupled together by at least one optical coupler, which allows the passage of light from the first to the second light guide layer, the at least one optical coupler comprising an edge coupler for coupling adjacent edges of the first and second light guide layers, the adjacent edges being parallel to a longitudinal axis of the first light guide layer,
a plurality of light sources, each light source being arranged such that light emitted by the light source is coupled into the first light guide layer at an interface surface arranged substantially perpendicularly to the longitudinal axis of the first light guide layer so that the light travels substantially in a direction parallel to the longitudinal axis of the first light guide layer;
a scattering element adapted to cause light to be emitted from an emitting surface of the second light guide layer; and
an optical structure associated with the second light guide layer adapted to couple light into a desired angular range,
wherein the at least one optical coupler comprises two spaced apart mirrored surfaces, wherein the at least one optical coupler comprises at least one coupling element passing between inwardly facing surfaces of the first and second light guide layers, wherein the optical structure is formed in the emitting surface, or an inwardly facing surface, opposite to the emitting surface, in the second light guide layer, wherein the first and second light guide layers and the optical coupler are integrally formed and wherein a gap is defined in the first light guide layer, the gap extending between two edges of the first light guide layer opposed along the longitudinal axis of the first light guide layer.

* * * * *